(12) United States Patent
Champness

(10) Patent No.: US 6,584,863 B2
(45) Date of Patent: Jul. 1, 2003

(54) DEVICE FOR MEASURING FLUID FLOW THROUGH A PIPE OR OPEN CHANNEL

(76) Inventor: Al T. Champness, 627 Williams St., Bakersfield, CA (US) 93305

( * ) Notice: Subject to any disclaimer, the term of this patent is extended or adjusted under 35 U.S.C. 154(b) by 0 days.

(21) Appl. No.: 10/104,134

(22) Filed: Mar. 22, 2002

(65) Prior Publication Data

US 2002/0134171 A1 Sep. 26, 2002

Related U.S. Application Data

(60) Provisional application No. 60/277,711, filed on Mar. 22, 2001.

(51) Int. Cl.[7] .................................................. G01F 1/28
(52) U.S. Cl. ................................................... 73/861.71
(58) Field of Search ........................ 73/861.71, 861.74, 73/861.75, 861.77, 861.78, 861.79, 861.352, 861.355, 227

(56) References Cited

U.S. PATENT DOCUMENTS

| 530,337 A | 12/1894 | Grover |
| 1,025,227 A | 5/1912 | Wylie |
| 1,164,441 A | 12/1915 | Woodman |
| 4,195,521 A | 4/1980 | Fitzgerald ..................... 73/227 |
| 5,811,688 A | * 9/1998 | Marsh et al. .................. 73/227 |

* cited by examiner

*Primary Examiner*—Hezron Williams
*Assistant Examiner*—Charlene Dickens

(57) ABSTRACT

An assembly for measuring fluid flow is provided having a base plate with an upstanding wall and a cut-out opening. A pivot shaft extends from the wall and a swinging arm is attached to the pivot shaft. At the lower end of the arm is a barrel shaft which supports a rotatable barrel. The base plate may be supported by legs and the assembly can then be positioned over an open stream of fluid. The arm is then swung down until the barrel enters the fluid. Alternatively, the assembly may be located above a top opening in a pipe containing a flowing stream of fluid. In this case, the arm and barrel will swing down through both the base plate cut-out opening and the pipe top opening. The moving fluid causes rotation of the barrel which is detected by a barrel rotation sensor. The sensor sends electronic signals to a signal processor which produces fluid velocity data. The arm may have an angular position sensor which will also deliver electronic signals to the signal processor. The combined rotation and angular signals are integrated by the signal processor to produce volumetric fluid flow data.

16 Claims, 2 Drawing Sheets

DEVICE FOR MEASURING FLUID FLOW THROUGH A PIPE OR OPEN CHANNEL

This application claims priority of Provisional Application No. 60/277,711 filed Mar. 22, 2001.

BACKGROUND OF THE INVENTION

1. Field of the Invention

The present invention pertains to the measurement of flowing fluids. More particularly, it concerns the measurement of fluid flow velocity and the volumetric flow rate of liquids and liquid/solid mixtures.

2. Description of Related Art

It has long been desirable to determine the amount of fluid flowing from an underground system or from culverts, ditches, conduits, pipes and the like so that a determination can be made with respect to overflow, breaks in the system or other problems that may result in unwanted flow restriction, leaks or stoppage. Attempts to measure flowing liquids have oftentimes incorporated movable cones as shown in U.S. Pat. No. 1,164,441 or drums having spaced-apart blades such as that shown in U.S. Pat. No. 1,025,227. Such systems translate the rotational spinning of the cones or drum blades into flow velocity data through worm gears, clock-like mechanical linkages and cables.

Problems with the above systems are their inaccuracy. Also, they require frequent maintenance and replacement of broken or worn-out parts. Additionally, many of the systems require a separate floating mechanism upon which is mounted a paddle-wheel device. Such devices are shown in U.S. Pat. No. 4,195,521 and U.S. Pat. No. 530,337. Using an additional float device creates multiple opportunities for inaccurate velocity readings because the float disturbs the natural flow of water toward the paddle wheel. Moreover, the float devices attract debris, accumulations of dirt and aquatic plants which denigrate the accuracy of the flow measurements and fluid levels being determined.

SUMMARY OF THE INVENTION

The present invention overcomes the above disadvantages by providing a flow indicator assembly that utilizes sensors and electronic instruments for measuring flowing fluids through a defined channel. The system does not require an additional floating mechanism nor mechanical linkages which are prone to malfunction. As used herein, the term fluid encompasses liquids, liquid colloidal suspensions slurries and entrained solid particulates in a moving liquid. A defined channel may be an open ditch, flume, stream bed, trough or on enclosed pipe, conduit or culvert.

In particular, the present invention provides a flow indicator assembly comprising a support structure positioned adjacent a stream of moving fluid, an elongated arm pivotally attached to the support structure arm and a barrel that is rotatably mounted to the lower-end portion of the arm. The arm can thereby swing the barrel in and out of a stream of fluid.

The barrel includes a rotation sensor which provides an electronic signal to a signal processor which computes the velocity of the fluid moving past the barrel. Also, the arm may include an angular position sensor which can be related to the level of fluid upon which the barrel floats.

The signal processor is calibrated with information from known fluid system input flow and then the processor electronically integrates the signals from both the barrel sensor and the arm sensor. The processor, or an auxiliary component such as a computer, can then record and display the velocity and/or volumetric rate of fluid flow of the moving fluid.

DESCRIPTION OF THE PREFERRED EMBODIMENTS

Figure 1:
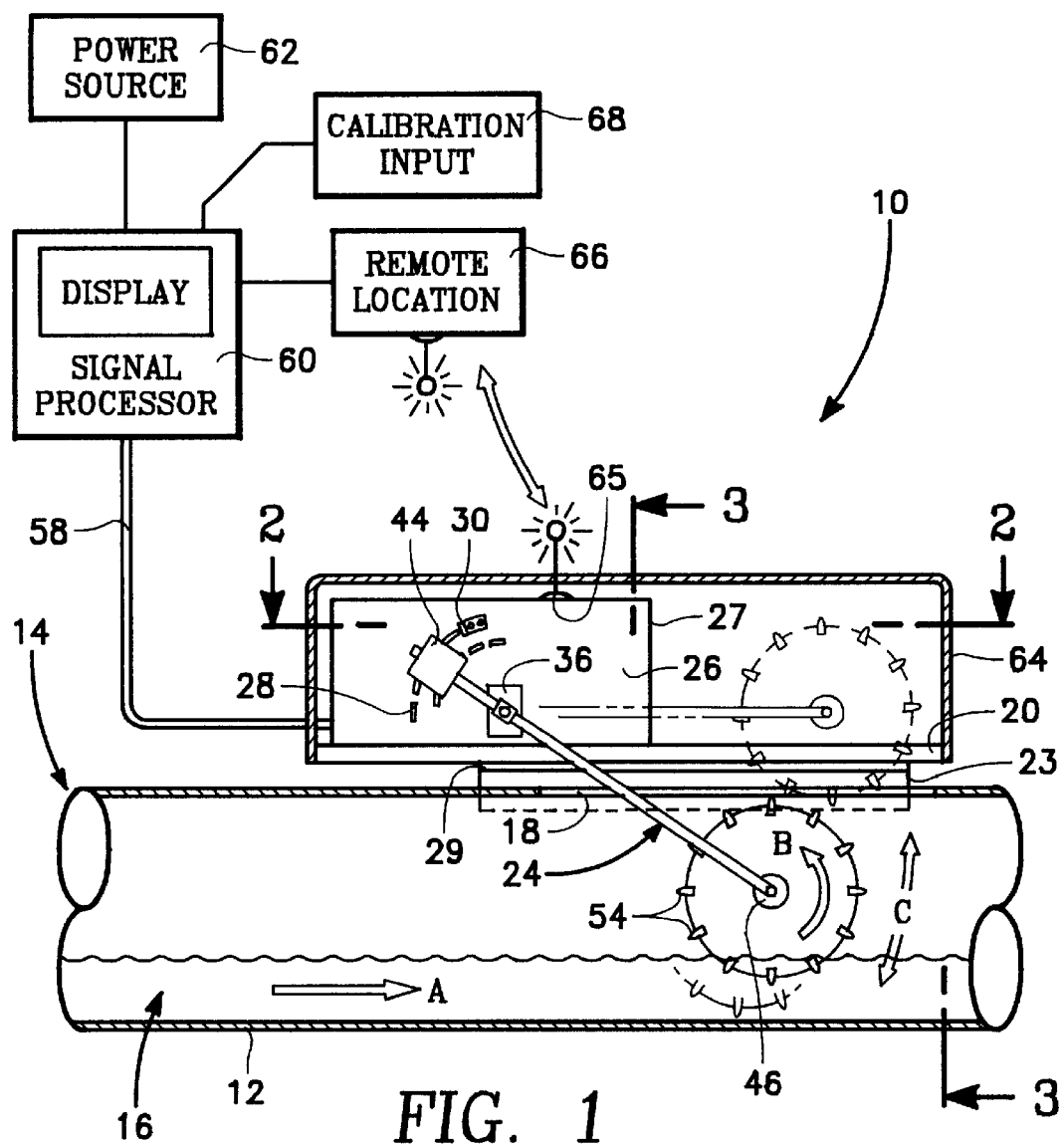
FIG. 1 is a schematic side elevation and partial cross-sectional view of the fluid flow indicator assembly of the present invention.
Figure 2:
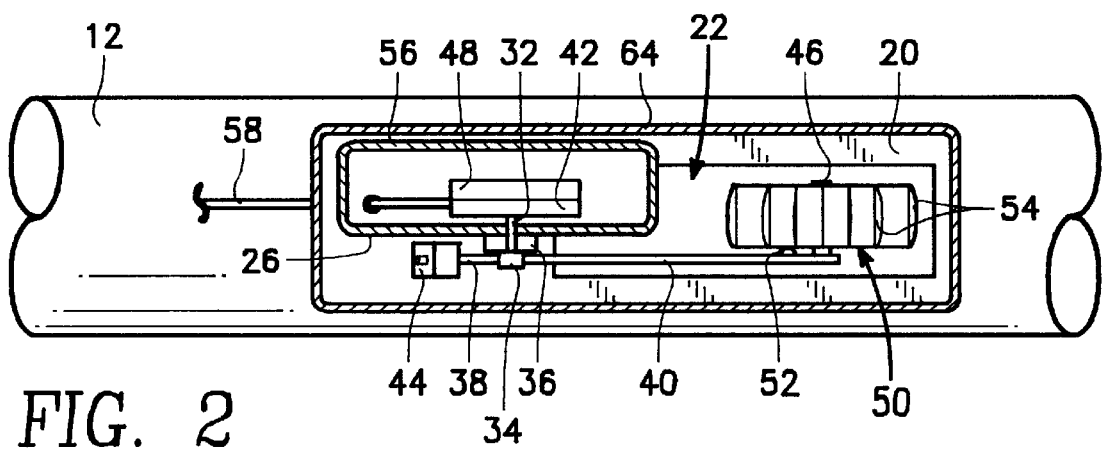
FIG. 2 is a top plan cross-sectional view taken along lines 2—2 of FIG. 1.
Figure 3:
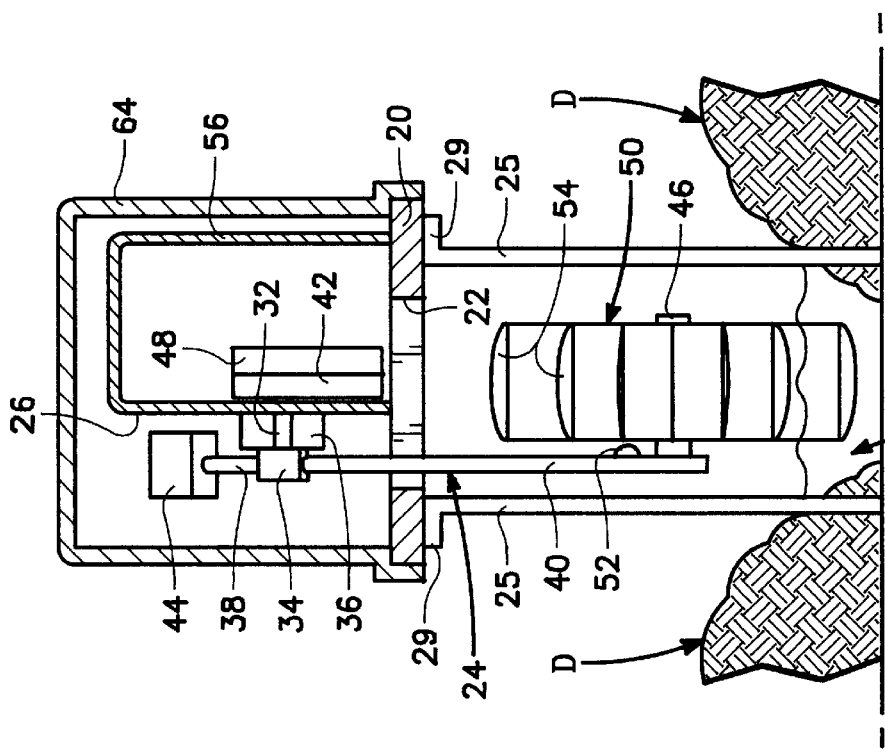
FIG. 3 is a cross-sectional view taken along lines 3—3 of FIG. 1.

With attention now to FIGS. 1–3 of the drawings, the overall fluid flow indicator assembly 10 is shown mounted upon a pipe 12. The pipe interior defines a flow channel 14 through which a moving fluid 16 flows in the direction shown by Arrow A.

To measure fluid flow inside the pipe, a top section of the pipe is provided with an elongated top opening 18. On each opposing side of the top opening is a mounting flange 23. Each flange has an outwardly flared ledge 29 which engages the assembly support structure. In the embodiment shown, the ledges engage the underside of support base plate 20. The base support flanges 23 may be permanently fixed to the pipe by welding and the base plate 20 is preferably releasably connected to the flange ledges by mechanical fasteners, such as bolt/nuts, screws, clamps and adhesives.

Extending longitudinally proximate the base plate midline, is an upstanding wall 26. The wall extends from near an end of the base plate to about the base plate mid-portion. In the area forward of the leading edge 27 of the wall, is a base opening 22. The opening has a width equal to, or somewhat less than, the width of pipe top opening 18.

Projecting outwardly from about the lower mid-portion of wall 26 is arm pivot shaft 32. The shaft is aligned to extend about perpendicular to the direction of fluid flow. It is supported by a hub 36.

The distal end of the pivot shaft is provided with an arm coupling 34. The coupling attaches arm 24 to the pivot shaft. It also delineates between an arm upper-end portion 38 and on arm lower end portion 40.

The length of the arm upper end portion is sufficient to extend past spaced-apart slots 28 in wall 26 for a purpose to be described below. The lower arm portion 40 has a longitudinal extent that is a matter of choice dictated by the specific application to which the flow indicator is being used. Optionally, the lower arm portion may be longitudinally adjustable by known telescoping means or by the addition of couplings and mid-length extensions.

As shown, the lower arm is about three times the length of the upper arm portion. This is adequate for the arm to reach almost to the bottom of flow channel 14 as depicted in phantom in FIG. 1. It will be noted that the arm is mounted on pivot shaft 32 in a manner so that it rotates in a plane that is parallel to the direction of fluid flow 16, shown by Arrow A.

Extending inwardly at the end of the lower-end arm portion 40 is barrel shaft 46. The barrel shaft extends in a direction that is parallel with pivot shaft 32 and about perpendicular to the direction of fluid flow.

Rotatably attached to the barrel shaft is barrel 50. The barrel should have a round symmetrical periphery. It may have a toroidal shape. Preferably, it will be buoyant in relation to the fluid. In such case, it may comprise a hollow shell of plastic or be constructed of buoyant material such as rubber, wood or cork.

The barrel includes engagement means for interacting with fluid moving through the flow chamber. Force of the fluid impinging on the engagement means will result in rotational movement of the barrel about the barrel shaft.

The engagement means may comprise grooves and serrations within the outer periphery of the barrel which will create fluid impingement surfaces thereby converting fluid movement forces to barrel rotation forces. Alternatively, the barrel may have paddles, baffles, vanes or a combination of any of the above projecting outwardly from the barrel periphery for the above described purpose of engagement with a moving fluid.

The barrel midline defines a plane that is about parallel to the direction of fluid flow. Therefore, as the fluid engages the barrel, the barrel wall rotate in the direction shown by Arrow B.

Depending upon the type of fluid and the rate of fluid flow, it may be appropriate to add to the barrel, radial outwardly extending ribs 54. The ribs should be equally spaced-apart and the barrel should be balanced around its center axis so that it can co-act with the moving fluid in a consistent, uniform manner.

For determining the number of barrel revolutions which, in turn, are used to compute the velocity flow of fluid passing thereby, a barrel rotation sensor 52 extends inwardly toward the barrel sidewall from lower arm portion 40. Typically, the rotation sensor utilizes a magnet and opposing plug coil (not shown) to send signal pulses through a wire located within the arm to the circuit terminal 48. From there, it passes through conduit 58 to signal processor 60.

The signal processor will compute the barrel rotation information and display and/or record the velocity of the moving fluid. The signal processor is connected to a power source 62 which may comprise any one or combination of, battery, solar cell or alternating current known in the art.

The combined width of the barrel plus the spaced-apart arm, must be less than the width of base opening 22. This will allow the arm and barrel to swing upwardly at least partially past the base plate to accommodate the varying levels of fluid in flow channel 14. This movement is indicated by Arrow C in FIG. 1 with phantom lines showing the uppermost position of the barrel when channel 14 is full of fluid.

The angular position of arm 24 is detected by a position sensor 42 into which pivot shaft 32 extends. This information will be transmitted as a signal through conduit 58 and into the aforementioned signal processor 60. The processor will then integrate that information with the velocity information derived from barrel rotation sensor 52 to compute, record and/or display the volume flow rate of the fluid. It will be appreciated that the signal processor and the display may be placed adjacent to the flow indicator assembly or it may interface with a remote computer. The display may also be located at a nearby safe area in case the fluid and/or area where the flow indicator is placed, is hazardous.

If the indicator assembly is used to detect fluid losses or gains from a predetermined fluid input, such as measuring drilling fluid outflow after it has been pumped into a drill-string, the input amount is provided to the signal processor by a calibration input device 68. Any negative or positive differentials will give drill operators an early notice of potential problems.

Detecting the above volume flow differentials was not possible in the prior art unless there was a continuously full flow of fluid through a flow channel of known cross-sectional area. The present assembly functions effectively at any fluid level. However, it is important with volume flow differential determinations, that all fluid outflow be directed through the indicator assembly flow channel.

When the fluid flow is at a low level and the barrel periphery is near the bottom interior surface of pipe 12, the indicator assembly provides for a stop means for continuing free rotation of the barrel. This is accomplished with the aforementioned slots 28 in wall 26. The slots allow for releasable securement to the wall of an arm abutment bracket 30. The bracket extends into the rotational pathway of upper arm portion 38 to provide positioning of the barrel.

When the upper arm portion is provided with a weighted arm part 44 to offset the weight of barrel 50, bracket 30 will abut against the part. In any case, the bracket can be attached to selected wall slots so that the barrel periphery can always be positioned slightly above the bottom interior surface of a flow channel. This will allow the barrel to continue rotating and provide signals even at low fluid flow rates.

Optionally, signal conduit 58 may be replaced with radio signals wherein the signals, as radio waves, may be transmitted from the arm position sensor and barrel rotation sensor by RF transmitter 65. A RF receiver 66 may be located at any outside location selected by a user. The receiver will then communicate the transmitted data to the signal processor.

To avoid contamination of the circuitry and instruments, the above devices may be protected with enclosure 56. This may be especially important to avoid splashing and contamination through the base opening 22. The inner wall of the enclosure may comprise the aforementioned wall 26.

Figure 4:
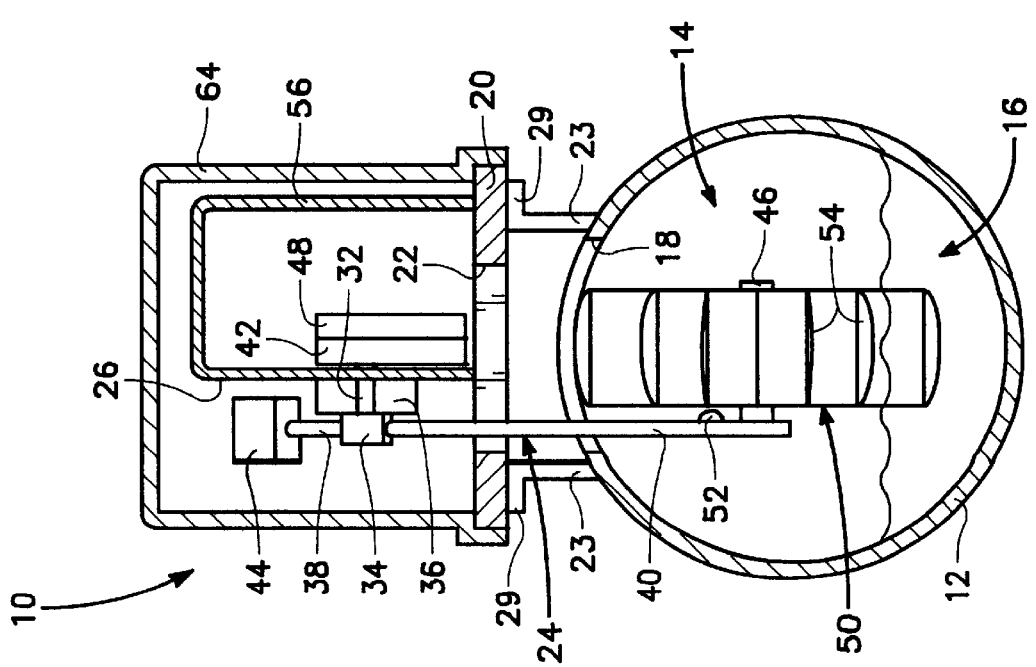
FIG. 4 is a view similar to FIG. 3 showing the barrel in a stream of fluid constrained by the sides of a ditch.

With reference to FIG. 4, the flow indicator assembly is shown being used to measure fluid flow through an open ditch shown by reference D. In such case, the base 20 is provided with elongated legs 25. The legs will elevate the assembly and allow the barrel to be properly positioned to float on fluid 16 while the circuitry is safely above the ditch. This arrangement would also be suitable for use over stream beds, troughs and similar open flow channels.

To protect the indicator assembly in outdoor or in hazardous environments, an overall cover 64 is provided. The cover is adapted to engage the periphery of the base plate 20. Preferably, it will include a peripheral gasket to provide an effective seal against outside conditions.

While the invention has been described with respect to preferred embodiments, it will be apparent to those skilled in the art that various modifications and improvements may be made without departing from the scope and spirit of the invention. Accordingly, it is to be understood that the invention is not to be limited by the aforesaid illustrative embodiments, but only by the scope of the appended claims.

I claim:

1. A flow indicator for a moving stream of fluid comprising:
 a support structure located above said fluid;
 an elongated arm pivotably attached to said support structure, said arm having an upper end portion and a lower end portion;
 a stop means on said support structure for limiting rotation of said arm at selected angular positions;

a barrel rotatably mounted to said lower end portion so that the axis of rotation of said barrel extends laterally to the flow direction of said fluid;

said barrel extending into said fluid so that said fluid will frictionally engage said barrel and cause rotation of said barrel about said axis of rotation;

a barrel rotation sensor in communication with said barrel;

a signal processor in communication with said barrel rotation sensor for determining the rate of flow of said fluid; and, an indicator means in communication with said signal processor for displaying said rate of flow.

2. The indicator of claim 1 including an arm position sensor in communication with said arm and said signal processor for determining the volumetric rate of fluid flow.

3. The indicator of claim 2 wherein said barrel is buoyant in said fluid.

4. The indicator of claim 3 including a weighted arm part adjustably attached to said upper end portion to selectively counterbalance the weight of said barrel.

5. The indicator of claim 1 including a pipe through which said fluid flows, said pipe having a top opening through which said barrel can pass and engage said fluid.

6. An indicator for measuring the flow of fluid through a channel comprising:

a fluid control means incorporating said channel for directing said fluid through said channel;

a support structure adjacent said fluid control means;

an arm having an upper end portion and a lower end portion rotatably attached to said support structure, said arm being rotatable in a plane that extends in a direction that is about parallel to the direction of fluid flow in said channel;

a stop means on said support structure for limiting rotation of said arm at selected angular positions;

a barrel rotatably attached to said lower end portion, said barrel being in engagement with said fluid and rotatable about an axis that extends in a direction that is about perpendicular to the direction of fluid flow in said channel;

a barrel rotation sensor in communication with said barrel;

a signal processor in communication with said barrel rotation sensor for determining the rate of flow of said fluid; and, an indicator means in communication with said signal processor for displaying said rate of flow.

7. The indicator of claim 6 wherein said barrel is buoyant in said fluid and said arm includes a counterweight adjustably attached to said upper end portion of said arm.

8. The indicator of claim 6 wherein said support structure comprises a base from which extends an upstanding member above said channel, said arm being rotatably attached to said upstanding member.

9. An assembly for measuring fluid flow comprising:

a channel containing fluid flowing in a predetermined direction;

a support structure having an arm pivot shaft;

an elongated arm attached to said pivot shaft, said arm having an upper end and a lower end;

a barrel shaft extending from said lower end;

a barrel attached to said barrel shaft and extending into said fluid, said barrel having fluid engagement means causing said barrel to rotate in concert with said flowing fluid;

a barrel rotation sensor in communication with said barrel that creates a rotation signal in relation to the rotation of said barrel;

a signal processor that receives said rotation signal, said processor having means to compute fluid flow velocity from said rotation signal;

display means in communication with said signal processor to display flow data processed by said signal processor; and, wherein said support structure includes stop means for limiting rotation of said arm at selected angular positions.

10. The indicator of claim 9 wherein said channel is defined by the interior of a pipe, said pipe having a top opening through which said arm and barrel can pass.

11. The indicator of claim 10 wherein said support structure includes a base having a base opening through which said arm and barrel can pass.

12. An assembly for measuring fluid flow comprising:

a channel containing fluid flowing in a predetermined direction;

a support structure having an arm pivot shaft;

an elongated arm attached to said pivot shaft, said arm having an upper end and a lower end;

a barrel shaft extending from said lower end;

a barrel attached to said barrel shaft and extending into said fluid, said barrel having fluid engagement means causing the barrel to rotate in concert with said flowing fluid;

a barrel rotation sensor in communication with said barrel that creates a rotation signal in relation to the rotation of said barrel;

an arm position sensor in communication with said arm that creates an angle signal pertaining to the angle of said arm relative to a predetermined base line;

a signal processor that receives said rotation signal and said angle signal, said processor having means to compute fluid flow velocity and volumetric flow rates from said rotation signal and said angle signal;

display means in communication with said signal processor to display flow data processed by said signal processor; and, wherein said support structure includes stop means for limiting rotation of said arm at selected angular positions.

13. The assembly of claim 12 including a calibration input unit in communication with said signal processor that provides calibration signals to said signal processor relating to baseline fluid flow values for determining the existence of fluid flow input and output differentials.

14. The assembly of claim 12 wherein said support structure includes a base plate having a base opening through which said arm and barrel can pass.

15. The assembly of claim 12 wherein said barrel is buoyant in said fluid and said upper arm portion includes a weighted arm part.

16. The assembly of claim 12 wherein said channel is defined by the interior of a pipe, said pipe having top opening through which said arm and barrel can pass.

\* \* \* \* \*